(12) United States Patent
Muro et al.

(10) Patent No.: US 6,999,177 B2
(45) Date of Patent: Feb. 14, 2006

(54) METHOD AND APPARATUS FOR MEASURING MULTI-PATH INTERFERENCE NOISE IN OPTICAL AMPLIFIER

(75) Inventors: Shinichirou Muro, Kawasaki (JP); Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 10/345,341

(22) Filed: Jan. 16, 2003

(65) Prior Publication Data

US 2003/0169427 A1    Sep. 11, 2003

(30) Foreign Application Priority Data

Mar. 6, 2002   (JP)   ............................ 2002-059777

(51) Int. Cl.
   *G01B 9/02* (2006.01)
(52) U.S. Cl. .................................... 356/477; 356/73.1
(58) Field of Classification Search ................ 356/477, 356/73.1; 398/26, 39
   See application file for complete search history.

(56) References Cited

U.S. PATENT DOCUMENTS

| 5,521,751 A |   | 5/1996  | Aida et al. |        |
|-------------|---|---------|-------------|--------|
| 5,561,551 A |   | 10/1996 | Iwasaki et al. |    |
| 5,677,781 A | * | 10/1997 | Mori et al. | 398/26 |

FOREIGN PATENT DOCUMENTS

| EP | 0 702 437 | 3/1996 |
|----|-----------|--------|
| JP | 8-114528  | 5/1996 |

OTHER PUBLICATIONS

S. Muro, et al., "Transient Response of Double Reyleigh Scattering in Optical Time-Domain Extinction Method" Optical Society of America Jul. 2002.
S.A.E. Lewis, et al., "Characterization of Double Rayleigh Scatter Noise in Raman Amplifiers", IEEE Photonic Technology Letters, vol. 12, No. 5, pp. 528-530, May 2000.
European Search Report for coresponding European Patent application, Serial No. 03001356.9, mailed Oct. 18, 2004.
S. Muro, et al., "Transient Response of Double Rayleigh Scattering in Optical Time-Domain Extinction Method" Optical Society of America, Jul. 2002.
Lewis et al., "Characterization of Double Rayleigh Scatter Noise in Raman Amplifiers" IEEE Photonic Technology Letters, vol. 12, No. 5, May 2000, pp. 528-530.

* cited by examiner

*Primary Examiner*—Samuel A. Turner
(74) *Attorney, Agent, or Firm*—Staas & Halsey LLP

(57) ABSTRACT

Power of multi-path interference light is measured by setting the cycle of pulse modulation for a light source in correspondence with the length of an optical medium of a target to be measured, by inputting pulse light after being modulated to the target to be measured, by modulating the pulse signal light output from the target to be measured with the use of a pulse signal for modulation having the same cycle as the set cycle, and by observing the wavelength dependency of the power of the light after being modulated. In this way, a modulation condition is set according to a condition of a target to be measured when multi-path interference light caused by double Rayleigh scattering light or reflection at the end of a connector is measured with a pulse-OSA method, so that measurement accuracy is improved.

13 Claims, 17 Drawing Sheets

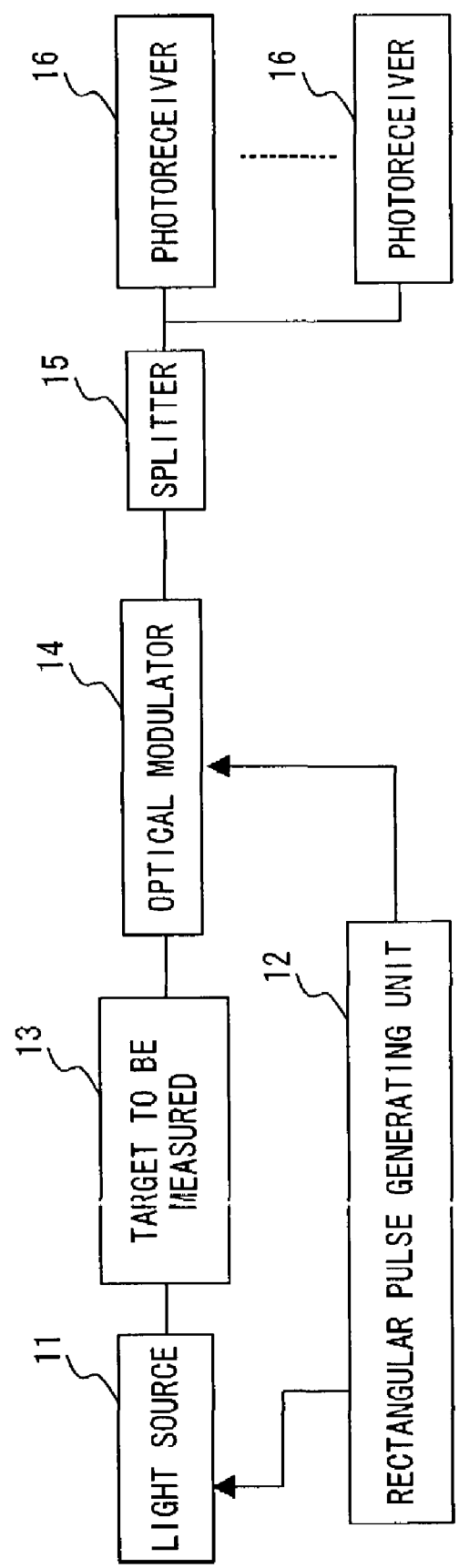
F I G. 2

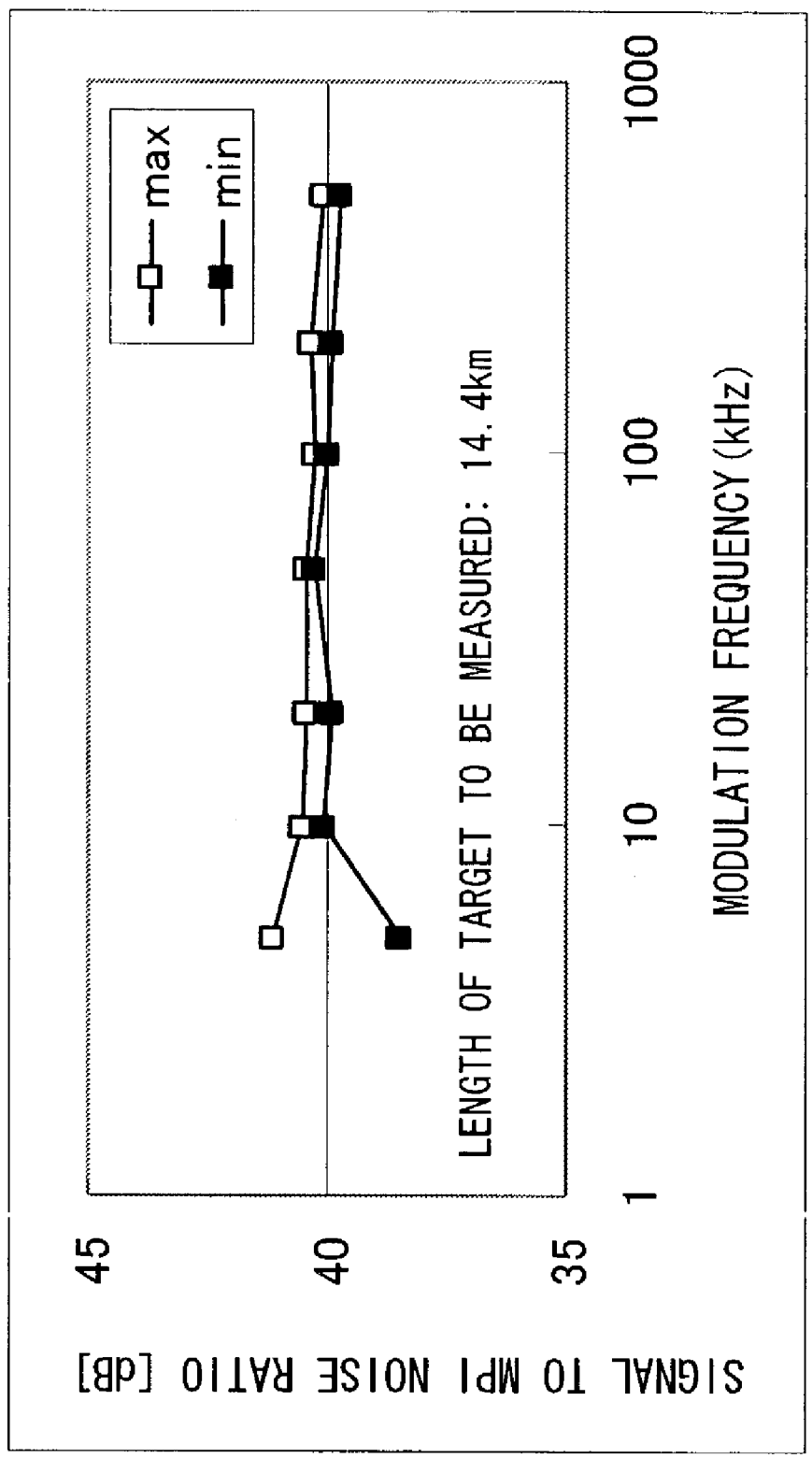
F I G. 12

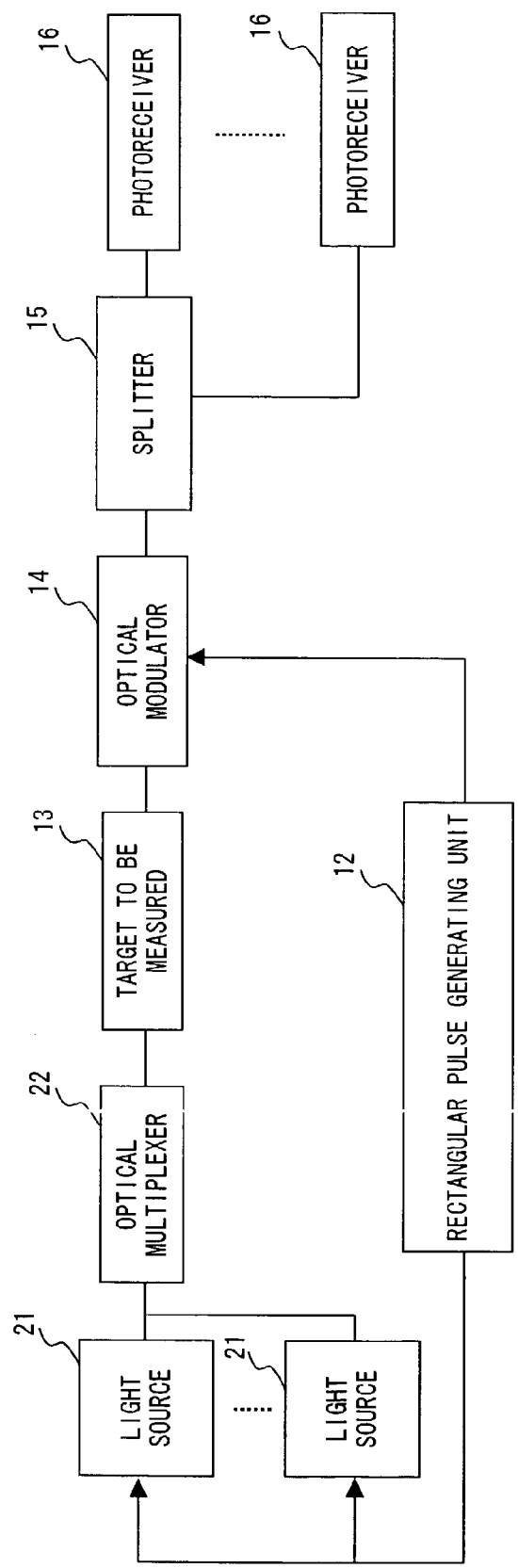
F I G. 14

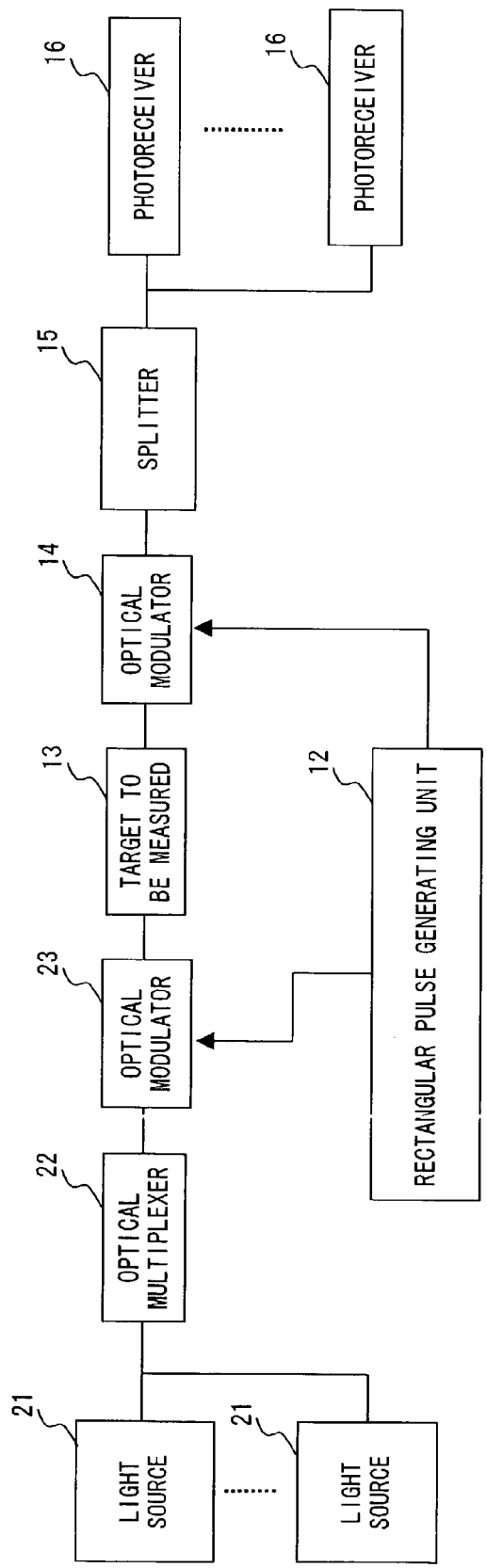
F I G. 15

METHOD AND APPARATUS FOR MEASURING MULTI-PATH INTERFERENCE NOISE IN OPTICAL AMPLIFIER

BACKGROUND OF THE INVENTION

1. Field of the Invention

The present invention relates to an optical communications system, and more particularly, to a multi-path interference light measuring method and apparatus which input rectangular-wave-modulated light to a target to be measured, such as an optical amplifier, and measure multi-path interference light on an output side, for example, like a pulse-OSA (Optical Spectrum Analyzer) method.

2. Description of the Related Art

In recent years, the speed and the capacity of an optical communication have been increasing with technology such as wavelength multiplexing, etc. Additionally, a rare-earth-doped fiber optical amplifier using an erbium-doped fiber, etc., and an optical amplifier using Raman effect have been advanced, and a linear repeater that amplifies light as it is has been put into practical use.

In a communications system using such optical amplifiers, one of problems which can possibly be a fault is noise, namely, a degradation of S/N ratio (signal to noise ratio). The first cause of the degradation of S/N ratio is spontaneous scattering light, namely, amplified spontaneous emission (ASE) light of an optical amplifier. The second cause of the degradation of the S/N ratio is multi-path interference light noise caused by double Rayleigh scattering (DRS) light of signal light, or reflection at the end of a connector.

An electric spectrum analyzer method, a pulse-OSA (Optical Spectrum Analyzer) method, etc. are used as methods measuring such noise. However, the pulse-OSA method is considered to be effective as a method measuring multiple-path interference light.

The following two documents exist as documents for measuring noise by using the pulse-OSA method.

Document 1) Japanese Patent Publication No. 08(1996)-114528, "Optical Amplifier Noise Figure Measuring Method and Apparatus".

Document 2) S. A. E. Lewis. et al., "Characterization of Double Rayleigh Scatter Noise in Raman Amplifiers", IEEE Photonic Technology Letters, Vol. 12, No. 5, pp. 528–530 (2000).

Document 1 discloses an optical amplifier noise figure measuring method and apparatus that can easily adjust the phases of the whole of a system to be measured including an optical fiber in a pulse-OSA method as a method measuring the noise figure of an optical fiber amplifier, especially, an optical fiber amplifier using a rare-earth-doped fiber such as an erbium-doped fiber, etc.

Document 2 proposes a measurement method using a pulse-OSA method in order to measure the noise light of a Raman amplifier that is significantly influenced by multi-path interference light of signal light in addition to spontaneous Raman scattering light. Unlike the spontaneous Raman scattering light, the multi-path interference light is a noise light component which occurs only on a signal light wavelength, and cannot be measured with an interpolation method or a probe method. Therefore, in Document 2, measurement using the pulse-OSA method is made by assuming that a pulse frequency is 500 kHz, the duty ratio of a pulse signal on an input side is 0.1, and the duty ratio of a modulation pulse for output signal light is 0.5.

With the pulse-OSA method, light emitted from a light source is modulated generally with a rectangular pulse whose cycle is sufficiently shorter than the lifetime of an atom having a high energy level, for example, of a rare-earth-doped fiber, and an optical pulse signal after being modulated is input to an optical amplifier to be measured. Then, an output pulse signal is modulated by using a rectangular pulse of an opposite phase, which has the same cycle as the pulse signal output from the optical amplifier to be measured, a noise light component is extracted, and the wavelength dependency of the power of the noise light is observed, for example, by combining a splitter and a plurality of photoreceivers, whereby the noise figure of ASE noise light of the amplifier to be measured can be measured.

If the ASE noise of an erbium-doped fiber amplifier is measured by using a pulse-OSA method as described above, a pulse cycle of approximately 1/100 or shorter of a transition time of several to several tens of milliseconds is used. This is because the lifetime of a spontaneous emission atom is relatively long.

However, the response time of multi-path interference light significantly varies depending on the length of an amplification medium. In document 2, the pulse frequency is held constant to be 500 kHz. However, if a pulse frequency is made constant in this way, multi-path interference light cannot be measured with high accuracy depending on a condition such as the length of an optical amplification medium, or the like.

SUMMARY OF THE INVENTION

An object of the present invention is to provide a method and an apparatus measuring multi-path interference light with high accuracy by setting the cycle of optical modulation on an input side, and a modulation condition for extracting a noise light component on an output side according to a condition such as the length of an optical medium of a target to be measured such as an optical amplifier, etc., in view of the above described problem.

To achieve the above described object, a method according to the present invention, which inputs pulse-modulated signal light to a target to be measured, and measures multi-path interference light included in the light output from the target to be measured, sets the cycle of pulse modulation on an input side in correspondence with the length of an optical medium of the target to be measured.

Additionally, a method according to the present invention, which inputs pulse-modulated signal light to a target to be measured, and measures multi-path interference light from the pulse signal light output from the target to be measured, sets the cycle of pulse modulation on an input side in correspondence with a measurement result of time till an optical pulse input to the target to be measured is output from the target to be measured.

An apparatus according to the present invention, which inputs pulse-modulated signal light to a target to be measured, and measures multi-path interference light from the pulse signal light output from the target to be measured, comprises: a cycle setting unit setting the cycle of pulse modulation on an input side in correspondence with the length of an optical medium of the target to be measured; and a modulating unit modulating the pulse signal light output from the target to be measured by using a modulation signal that has the same cycle as the set cycle, and can arbitrarily set a phase difference from the output pulse signal.

Additionally, an optical signal inputting apparatus, which inputs a pulse-modulated signal to a target to be measured so as to allow multi-path interference light to be measured from the pulse signal light output from the target to be measured, comprises a cycle setting unit setting the cycle of pulse modulation on an input side in correspondence with the length of an optical medium of the target to be measured.

Furthermore, an apparatus according to the present invention, which measures multi-path interference light from pulse signal light output from a target to be measured to which a pulse-modulated signal is input, comprises a modulating unit modulating the output pulse signal by using a pulse signal for modulation, which has the same cycle as the pulse signal input to the target to be measured, and whose delay time from the rising time of the input pulse light is determined according to the cycle, the duty ratio of the input pulse signal, and a delay time of the output pulse from the input pulse.

BRIEF DESCRIPTION OF THE DRAWINGS

FIG. 2 is a block diagram showing the configuration of a multi-path interference light measuring apparatus according to a first preferred embodiment;

FIG. 12 shows measurement fluctuations of a signal to MPI noise ratio when the rising timing of a pulse of an output switch is changed;

FIG. 14 is a block diagram exemplifying the configuration of an apparatus measuring the wavelength dependency of multi-path interference light;

FIG. 15 is a block diagram exemplifying another configuration of the apparatus measuring the wavelength dependency of multi-path interference light;

DESCRIPTION OF THE PREFERRED EMBODIMENTS

Figure 1:
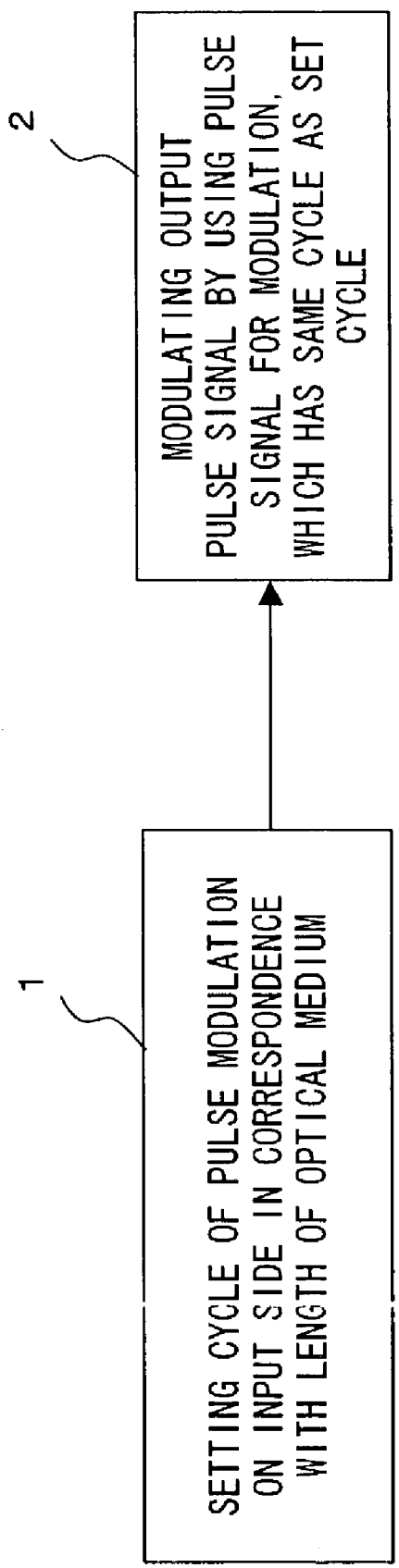
FIG. 1 is a schematic diagram showing the principle of the present invention.

FIG. 1 is a schematic diagram showing the principle of a multi-path interference light measuring method according to the present invention. This figure is a schematic diagram showing the principle of a multi-path interference light measuring method inputting pulse-modulated signal light to a target to be measured, such as an optical amplifier, and measuring multi-path interference light from the pulse signal light output from the target to be measured.

According to the present invention, the cycle of pulse modulation on the input side of a target to be measured is set in correspondence with the length of an optical medium of the target to be measured in 1 of FIG. 1. In a preferred embodiment according to the present invention, this cycle is set to L×N/c or shorter in correspondence with the velocity c of light in a vacuum, length L of an optical medium of a target to be measured, and a group refractive index N of the optical medium.

In FIG. 1, an output pulse signal is modulated by using a pulse signal for modulation in 2. In the preferred embodiment, it is assumed that this pulse signal for modulation has the same cycle as the set cycle of pulse modulation on the input side, and whose delay time from the rising time of input pulse light is determined according to the cycle, the duty ratio of the input pulse signal, and a delay time of the output pulse from the input pulse, namely, the propagation time of light within the target to be measured.

In the preferred embodiment, the duty ratio of the pulse signal for modulation to the output pulse signal can be also determined in correspondence with the cycle and the duty ratio of the input pulse signal, and the rising time of the output pulse. Additionally, the power of multi-path interference light can be also obtained based on a result of splitting the output pulse signal after being modulated. Furthermore, multi-path interference light can be also measured by inputting light, which is obtained by wavelength-multiplexing lights output from a plurality of light sources of different wavelengths, and by pulse-modulating the wavelength-multiplexed light, to the target to be measured.

Additionally, a multi-path interference light measuring method according to the present invention sets the cycle of pulse modulation on an input side in correspondence with a measurement result of time until an optical pulse input to a target to be measured is output from the target to be measured.

A multi-path interference light measuring apparatus according to the present invention comprises: a cycle setting unit setting the cycle of pulse modulation on an input side of a target to be measured in correspondence with the length of an optical medium of the target to be measured; and a modulating unit modulating an output pulse signal by using a modulation signal which has the same cycle as the output pulse signal, and can arbitrarily set a phase difference from the output pulse signal.

In a preferred embodiment according to the present invention, an optical signal inputting apparatus, which inputs a pulse-modulated signal to a target to be measured so as to allow multi-path interference light to be measured from the pulse signal light output from the target to be measured, comprises a cycle setting unit setting the cycle of pulse modulation on an input side in correspondence with the length of an optical medium of the target to be measured.

Furthermore, in a preferred embodiment according to the present invention, an apparatus, which measures multi-path interference light from a pulse signal output from a target to be measured, comprises a modulating unit modulating an output pulse signal by using a modulation signal which has the same cycle as a pulse signal input to the target to be measured, and can arbitrarily set a phase difference from the output pulse signal.

As described above, according to the present invention, cycle setting of pulse modulation on the input side of a target to be measured, and the like are performed according to conditions such as the length, and the group refractive index of an optical amplification medium, etc.

FIG. 2 is a block diagram showing the configuration of a multi-path interference light measuring apparatus according to the first preferred embodiment of the present invention. Preferred embodiments according to the present invention are described by assuming that a pulse-OSA method similar to a conventional one is fundamentally used as a method measuring multi-path interference light. Additionally, in the present invention, a target to be measured of multi-path interference light is typically an optical fiber amplifier. However, the target to be measured is not limited to an optical fiber amplifier, and may be an optical fiber in which multi-path interference light occurs, or various types of appliances using an optical waveguide, and the like.

In FIG. 2, a rectangular pulse whose cycle is sufficiently short as described above is provided to a light source 11 by a rectangular pulse generating unit 12, pulse modulation is performed for a laser current of the light source 11, and this signal light is input to a target to be measured 13. The light from the light source 11 is assumed to have a line width that is sufficiently narrower than the wavelength resolution of an optical power monitor composed of a splitter 15 and photoreceivers 16.

The pulse signal output from the target to be measured 13 is modulated by an optical modulator 14, and a noise light component is extracted. For this noise component extraction, a pulse signal of an opposite phase, which has the same cycle as the output pulse signal, namely, a pulse signal which is turned on when a signal output pulse is not output (in an OFF state) is provided to the optical modulator 14 by the rectangular pulse generating unit 12. The noise light component output from the optical modulator 14 is then split by the splitter 15, the split optical wavelengths are provided to the plurality of photoreceivers 16, and the wavelength dependency of the noise light is observed.

In FIG. 2, it is assumed that the rectangular pulse generating unit 12 pulse-modulates the light source 11 on the input side, and controls the optical modulator 14 on the output side. The apparatus may be also available respectively as an optical signal inputting apparatus on the input side, and a multi-path interference light measuring apparatus on the output side by dividing the rectangular pulse generating unit 12 into two.

Figure 3:
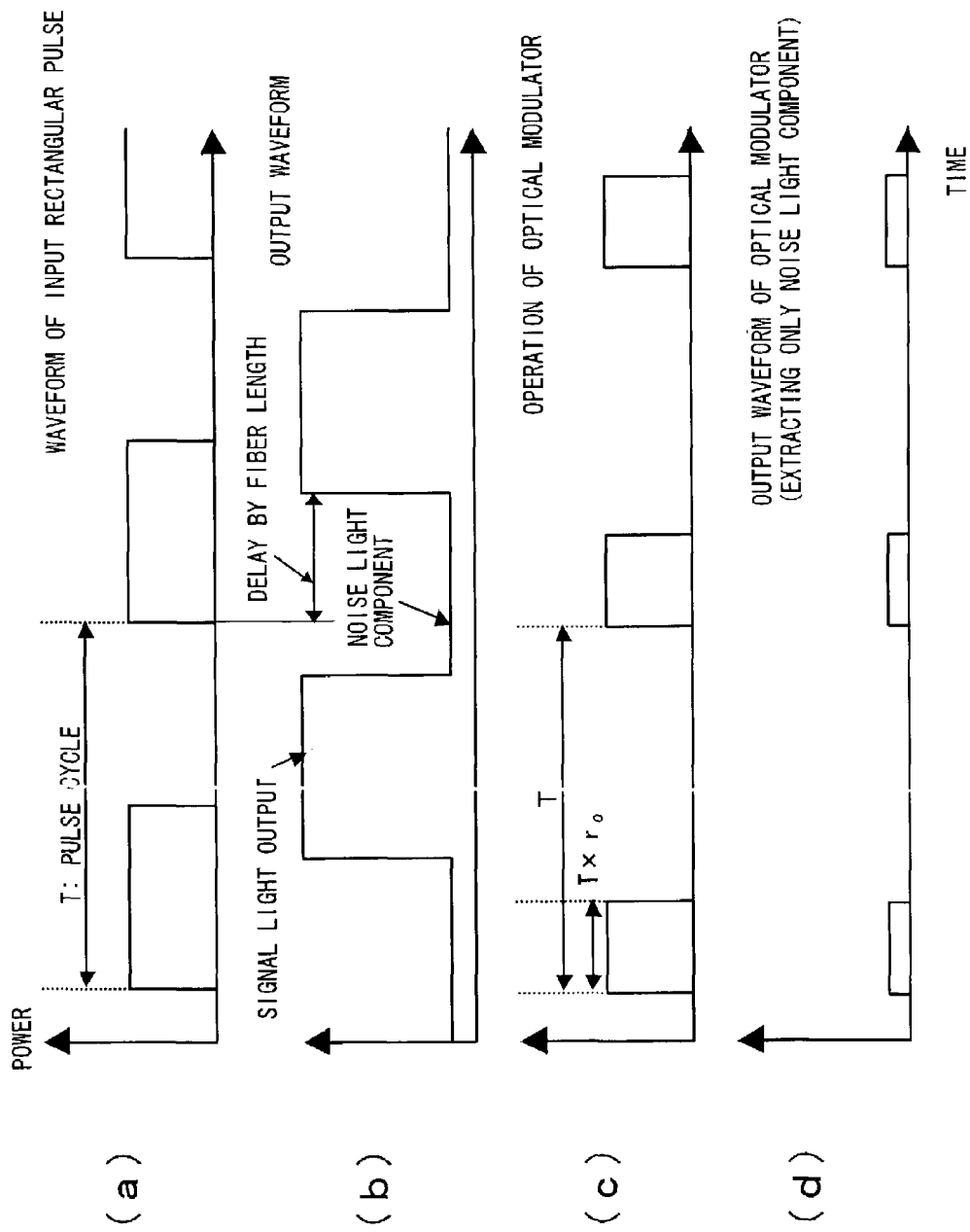
FIG. 3 explains operational timings of the multi-path interference light measuring apparatus.

FIG. 3 explains the operational timings of the multi-path interference light measuring apparatus shown in FIG. 2. (a) of FIG. 3 indicates a rectangular pulse waveform input from the light source 11 to the target to be measured 13, and its cycle T has a value that is sufficiently smaller than the lifetime of an atom having a high energy level, for example, of erbium as described above. In the first preferred embodiment, the cycle T is determined by the following expression with the use of a length L of, for example, a fiber as the optical medium of the target to be measured, and its group refractive index N (refractive index dependent on a wavelength c of light).

$$T \leq L \times N/c \quad (1)$$

By calculating the mathematical expression (1), the propagation time of the input pulse signal within the target to be measured can be obtained. Here, c is the velocity of light in a vacuum.

Figure 4:
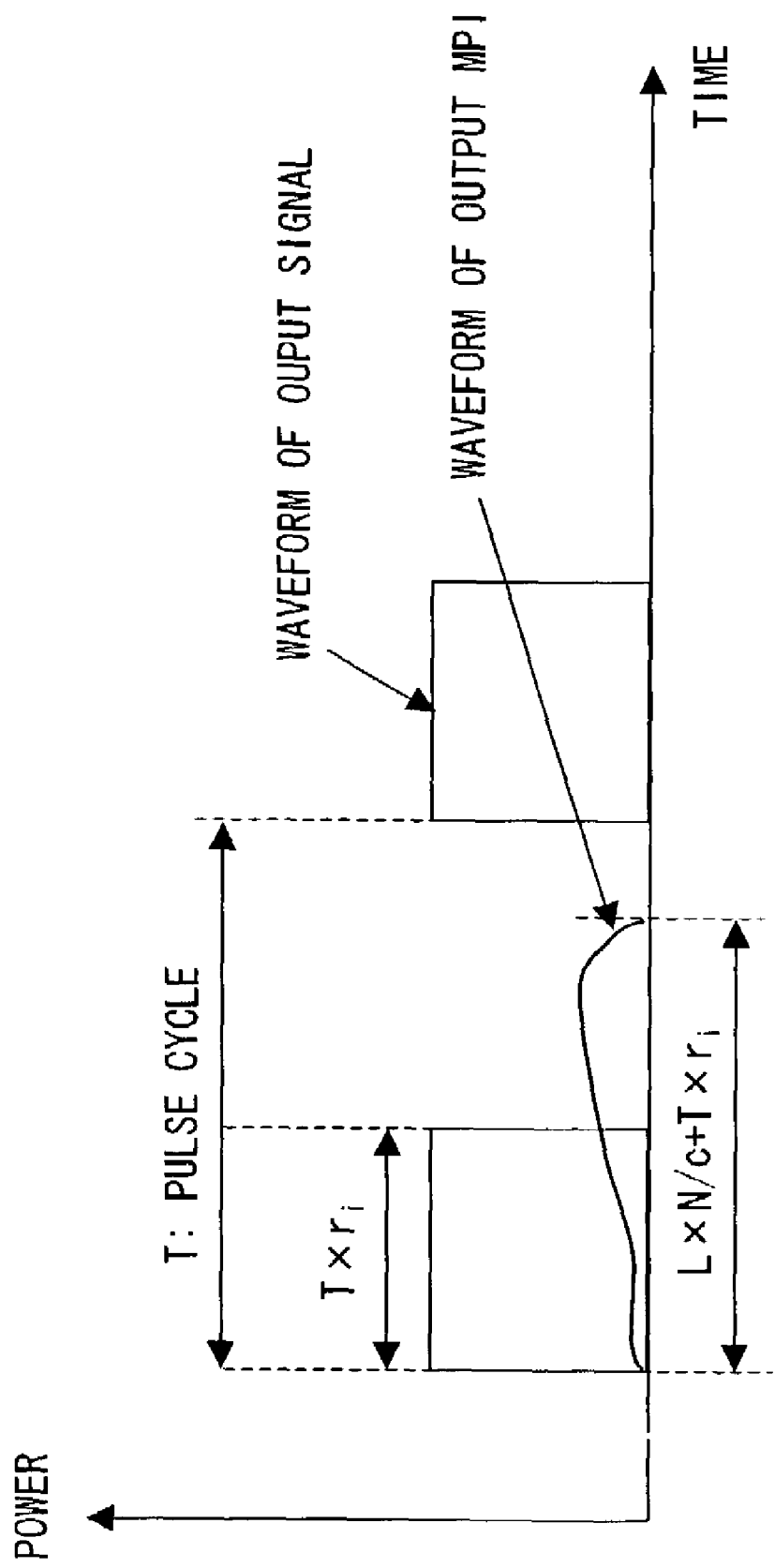
FIG. 4 explains the fluorescence time of output MPI light in correspondence with one input pulse.

FIG. 4 explains the fluorescence time of multi-path interference (MPI) light on the output side in correspondence with one pulse on the output side. In this figure, the pulse waveform of an input signal is omitted.

In FIG. 4, the pulse waveform of the output signal naturally has the same cycle T as the input signal and its pulse width is determined by a duty ratio $r_i$ of the input pulse. As described with reference to FIG. 2, the optical modulator 14 performs modulation for measuring MPI light in a time period during which the output pulse is not ON in the output of the target to be measured 13. To efficiently measure the MPI light, it is desirable that the MPI light is not 0 in the whole span of the measurement.

The fluorescence time of MPI light is the sum of a pulse width $T \times r_i$ (the same as an input pulse) of an output pulse, and a propagation time until the MPI light which occurs in correspondence with, for example, the rising time of the input pulse is output from the target to be measured 13 as shown in FIG. 4, and given by the following expression.

$$T \times r_i + L \times N/c \quad (2)$$

If a time period in which the MPI light becomes 0 exists during the pulse cycle T as shown in FIG. 4, the portion where the MPI light is 0 is monitored, leading to a deterioration of monitor power, although this depends on how to set a measurement time period of noise output from the optical modulator 14 shown in FIG. 2. By setting the pulse cycle T of the input pulse to a value that is sufficiently smaller than the right side of the expression (1), the portion where the MPI light is 0 can be prevented from being monitored, and the MPI light can be measured with high accuracy, although this depends on the value of the duty ratio of the input pulse.

Turning back to FIG. 3. (b) indicates a waveform output from the target to be measured 13, and an output pulse is output with a delay corresponding to the propagation time of light within the target to be measured 13. Since the output in a time period during which this pulse is OFF is a noise component including MPI light, the MPI light must be measured in this time period.

(c) indicates an operational waveform of the optical modulator 14. By operating the optical modulator 14 in the time period during which the output pulse of the signal light indicated by (b) is OFF, only a noise light component is extracted as the output of the optical modulator 14 as indicated by (d). Here, the width of the pulse which operates the optical modulator is the product of the pulse cycle T having the same value as an input and the duty ratio $r_O$ on the output side. Additionally, although the rising time of this pulse is set to the same time as that of the input rectangular pulse here, this is merely one example.

Figure 5:
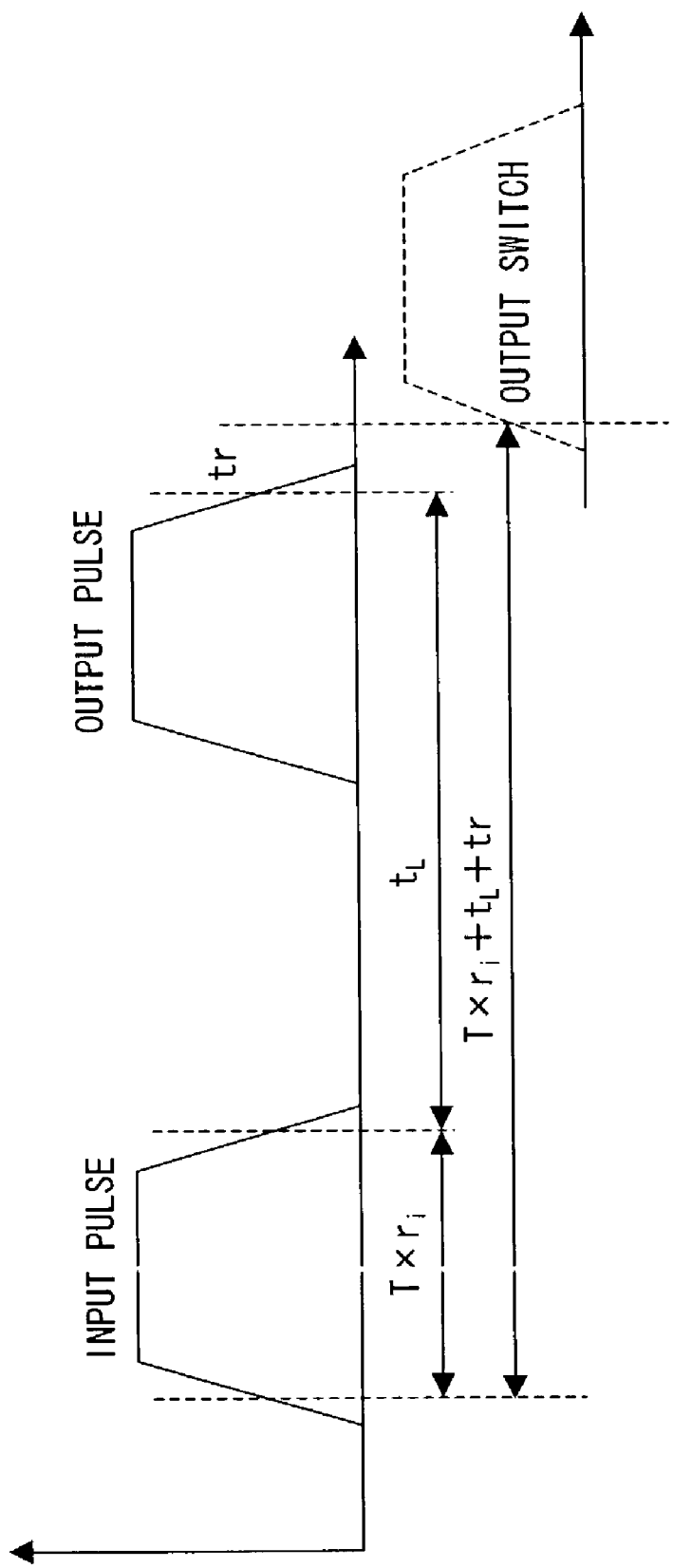
FIG. 5 explains a method setting a rising time of a pulse of an output side switch.

FIG. 5 explains a method setting the rising time of the pulse which operates the optical modulator 14, namely, a switching start time of an output switch of the optical modulator 14. In this figure, an input pulse and an output pulse respectively represent the pulses indicated by (a) and (b) of FIG. 3, and it is assumed that the duty ratio of the input pulse is $r_i$, the propagation time of light within the target to be measured 13 shown in FIG. 2 is $t_L$, and all of the rising and the falling times of the input and the output pulses are $t_r$. The duty ratio $r_i$ of the input pulse indicates the ratio of the power of input pulse signal light to its peak power (power in case of $r_i$=1).

The falling time of the output pulse in FIG. 5 is the sum of the pulse width of the input pulse and its propagation time $t_L$. The falling time $t_r$ of the output pulse is added to this sum, so that the difference between the operational times (corresponding to a phase difference) of the input side switch, namely, the switch on the side of the light source 11, which is controlled by the rectangular pulse generating unit 12, and the output side switch on the side of the optical modulator 14 is given by the following expression.

$$t_\phi = T \times r_i + t_L + t_r \quad (3)$$

Here, assuming that the duty ratio of the input pulse is 0.5, and the propagation time of the pulse is made equal to the cycle T, the above described time is given by the following expression.

$$t_\phi = 3T/2 + t_r \quad (4)$$

Figure 6:
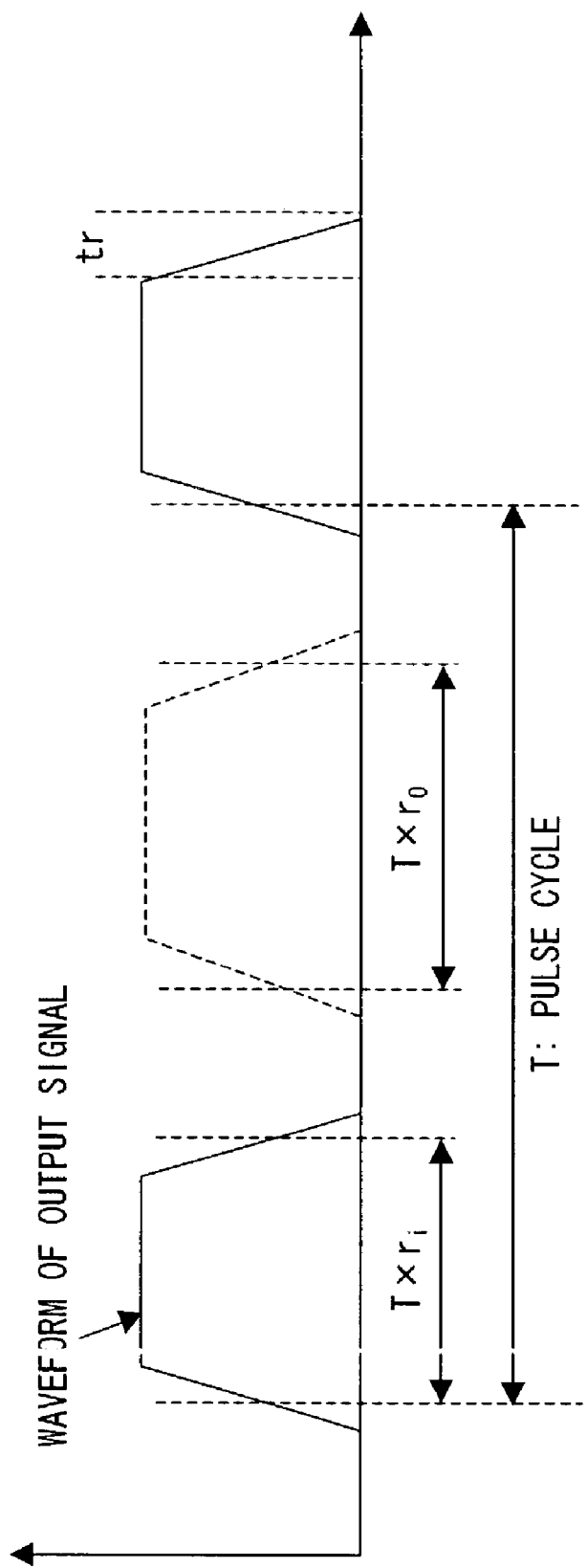
FIG. 6 explains a method setting the duty ratio of the pulse of the output side switch.

A method determining the width, namely, the duty ratio of the output switch pulse is described next with reference to FIG. 6. As described with reference to FIG. 4, the pulse width of the output switch, in which MPI light is measured, fundamentally corresponds to a time period during which the output pulse is OFF. Here, the duty ratio $r_0$ of the pulse of the output switch is determined by the following expression based on FIG. 6 in consideration of the rising and the falling times of the input and the output pulses shown in FIG. 5.

$$S/P_{noise} \leq r_0 \leq (1-r_i) - 2t_r/T \quad (5)$$

Actually, setting this duty ratio to a larger value enables MPI light to be measured with higher accuracy. Therefore, the value of $r_0$ is set by providing a margin to the value on the right side. S in the inequality on the left side of the expression (5) is the sensitivity of the optical power monitor which is configured by the splitter 15 and the photoreceivers 16, which are shown in FIG. 2, whereas $P_{noise}$ is the electric power of noise light input to the photoreceivers 16. This inequality indicates that the duty ratio of the optical pulse for the output side switch must be determined so that the power of noise exceeds the sensitivity of the photoreceivers.

Figure 7:
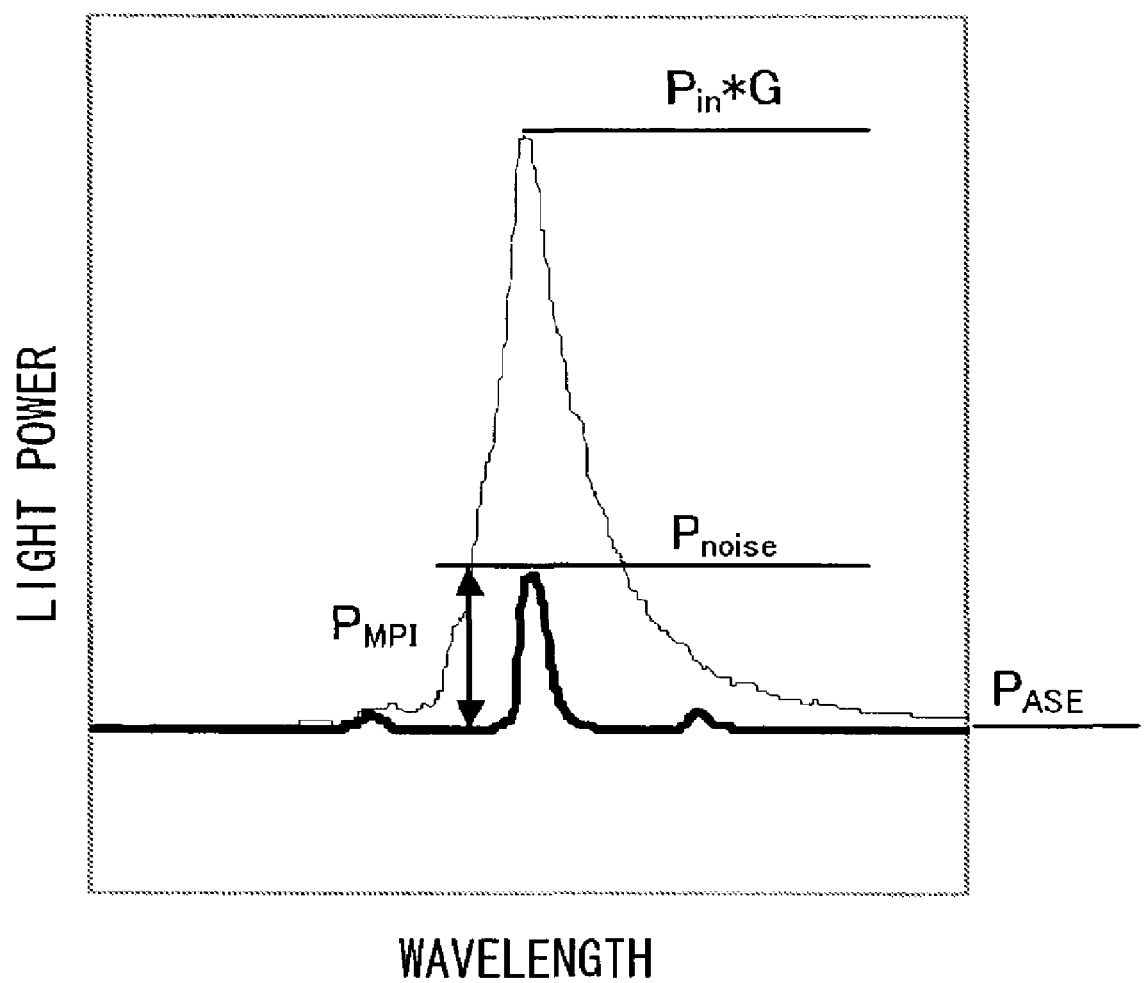
FIG. 7 exemplifies the spectrum of the output of the optical modulator.

A method calculating the power of multi-path interference light, namely, MPI light is described next. FIG. 7 explains the measurement of the power of MPI light from the output spectrum of the optical modulator 14 shown in FIG. 2. In this figure, a thin line indicates the spectrum of the signal light output indicated by (b) of FIG. 3, whereas a thick line indicates the spectrum of a noise component. These spectra have their own peaks in the wavelength of the light source 11 shown in FIG. 2 as a matter of course. The peak value of the spectrum of the signal light output is the product of power $P_{in}$ of the input signal light and a gain G of the target to be measured 13, whereas the peak value of the noise component is power $P_{noise}$ of the noise light component.

In FIG. 7, $P_{ASE}$ indicates the power of spontaneous emission light which is amplified by the target to be measured 13, and its value normally becomes a constant value which is not dependent on a wavelength in the proximity of the signal light wavelength. Accordingly, power $P_{MPI}$ of multi-path interference light, namely, MPI light fundamentally becomes the difference between $P_{noise}$ and $P_{ASE}$. Additionally, the value of $P_{MPI}$ is calculated by further subtracting the component of light leaking from the target to be measured 13 from this difference.

Namely, if the ratio of extinguished light to the light input to the target to be measured 13 is defined to be $r_{ext1}$, power $P_1$ of the leaking light that is amplified by a gain G and output is given by the following equation.

$$P_1 = P_{in} \times G/r_{ext1} \quad (6)$$

Furthermore, if the ratio of the light extinguished by the optical modulator 14 to the light output from the target to be measured 13 is defined to be $r_{ext2}$, and the power of the output light is defined to be $P_{OUT}$, the power of light leaking from the output light is given by the following expression.

$$P_2 = P_{out}/r_{ext2} = P_{in} \times G/r_{ext2} \quad (7)$$

Based on the above provided explanation, the following expression is satisfied for the power $P_{MPI}$ of MPI light.

$$P_{MPI} \times r_0 = P_{noise} - P_{ASE} - P_1 - P_2 \quad (8)$$

By using the above provided expressions (6) to (8), the power of MPI light is given by the following equation.

$$P_{MPI} = \frac{P_{noise} - \left\{ P_{ASE} + P_{in} G \left( \frac{1}{r_{ext1}} + \frac{1}{r_{ext2}} \right) \right\}}{r_0} \quad (9)$$

In summary, the power of light having the same wavelength as that of the light source, and the power of an ASE component having a wavelength different from the light source are measured at the timing when no signal light exists, and arithmetic operations are performed based on the measured powers with the expressions (6) to (9), where by multi-path interference light can be obtained.

Figure 8:
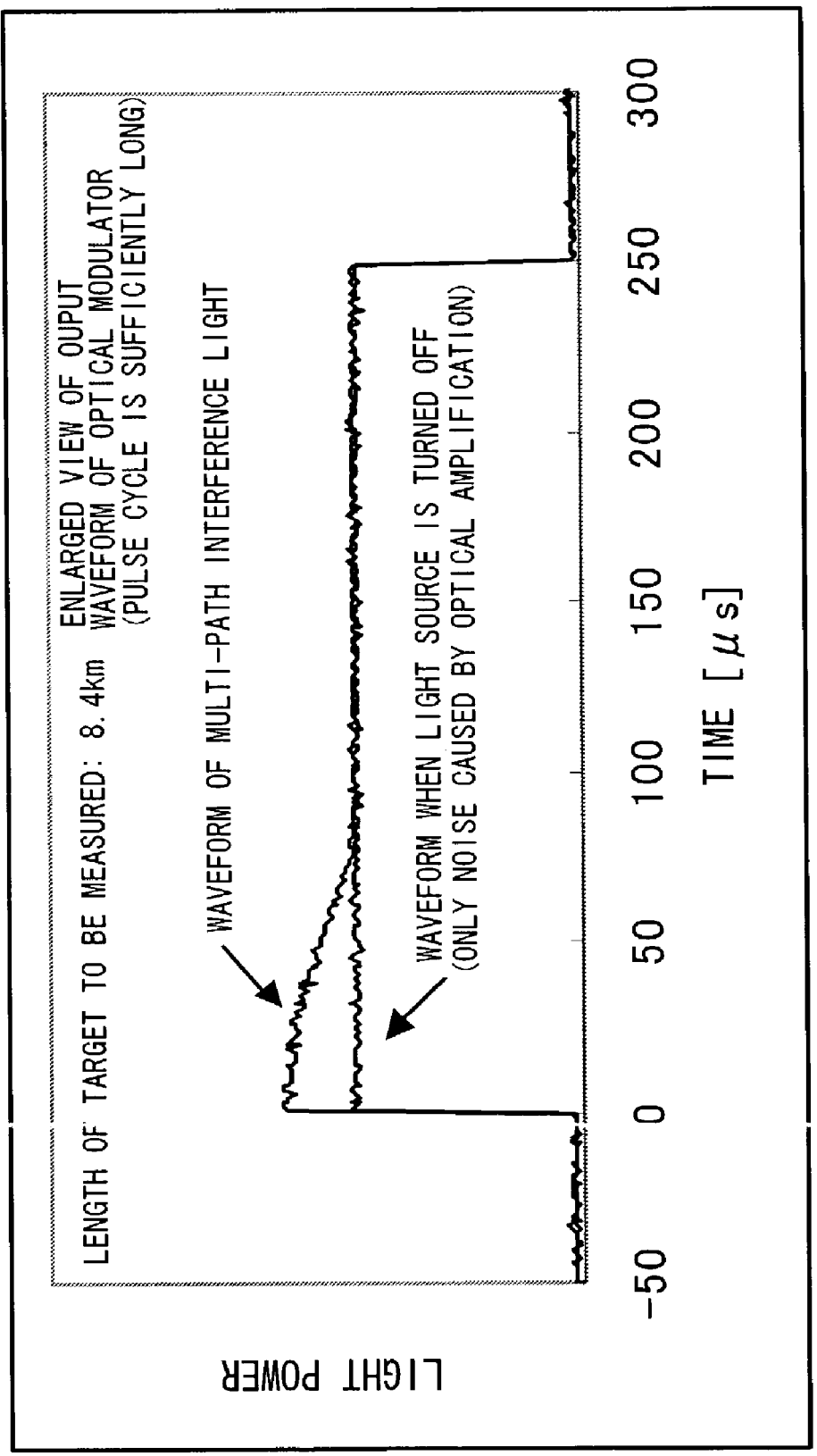
FIG. 8 shows an example (No. 1) of a waveform output from the optical modulator.
Figure 9:
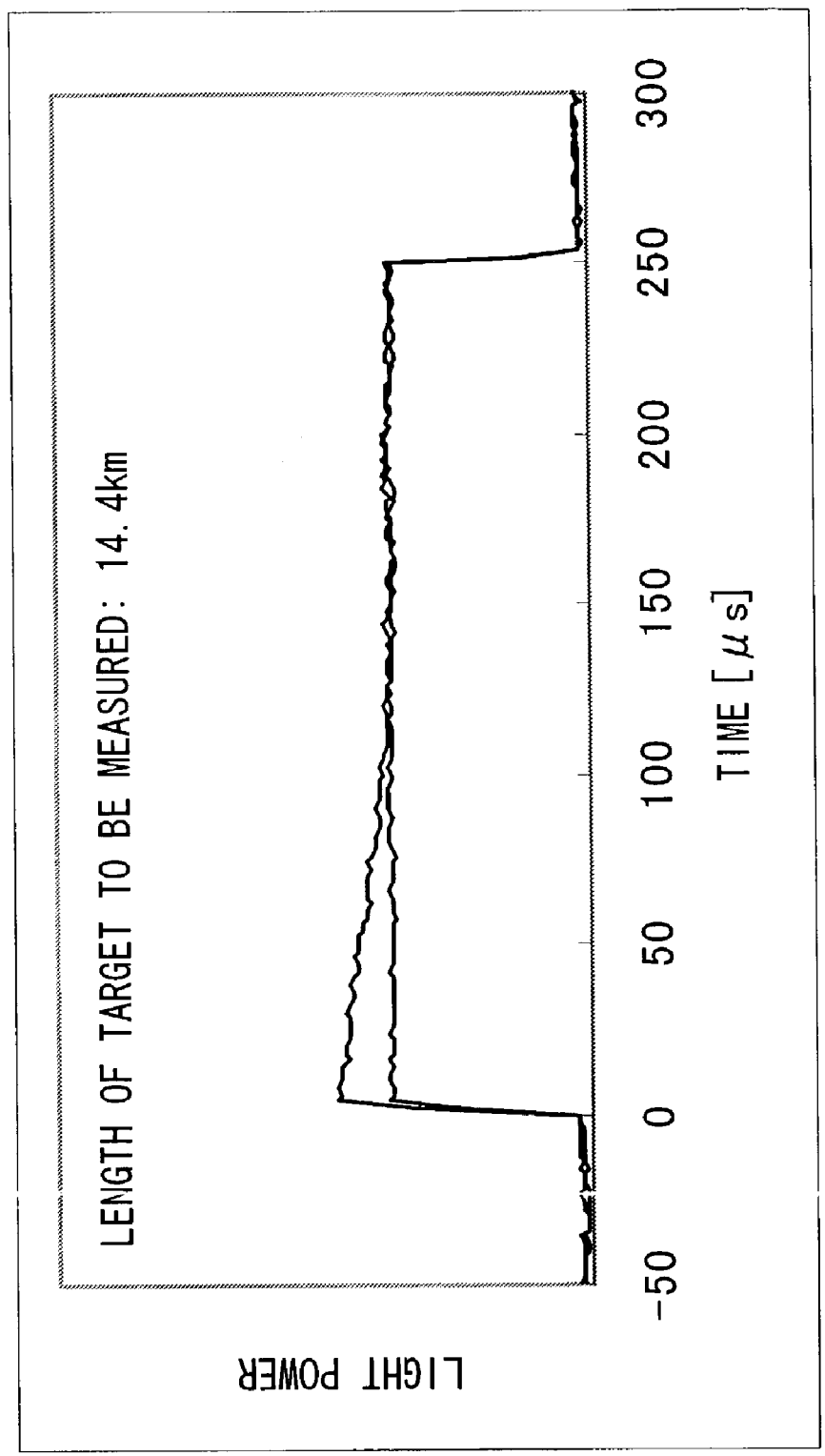
FIG. 9 shows an example (No. 2) of the waveform output from the optical modulator.

FIGS. 8 and 9 exemplify the output waveforms of the optical modulator 14 shown in FIG. 2. FIG. 8 is an enlarged view exemplifying the waveform in the case where the frequency of an input pulse is 1 kHz, and the length of the target to be measured 13 is 8.4 km, whereas FIG. 9 is an enlarged view exemplifying the waveform in the case where the length of the target to be measured 13 is 14.4 km. A time width during which the output of the modulator 14, namely, the switch on the output side is turned on is 250 $\mu$m in both of FIGS. 8 and 9. If the output of the target to be measured 13, which is observed when the light source 11 is turned off, includes only noise, for example, caused by an optical amplification operation, the value of the power of the light becomes constant. In the meantime, if the light source 11 is turned on, a noise component caused by multi-path interference light is first superposed and observed in addition to noise caused only by optical amplification, namely, the component of amplified spontaneous emission light. The time period during which the noise component caused by multi-path interference light is observed becomes longer in the case where the length of the target to be measured 13 is longer as shown in FIG. 9.

Figure 10:
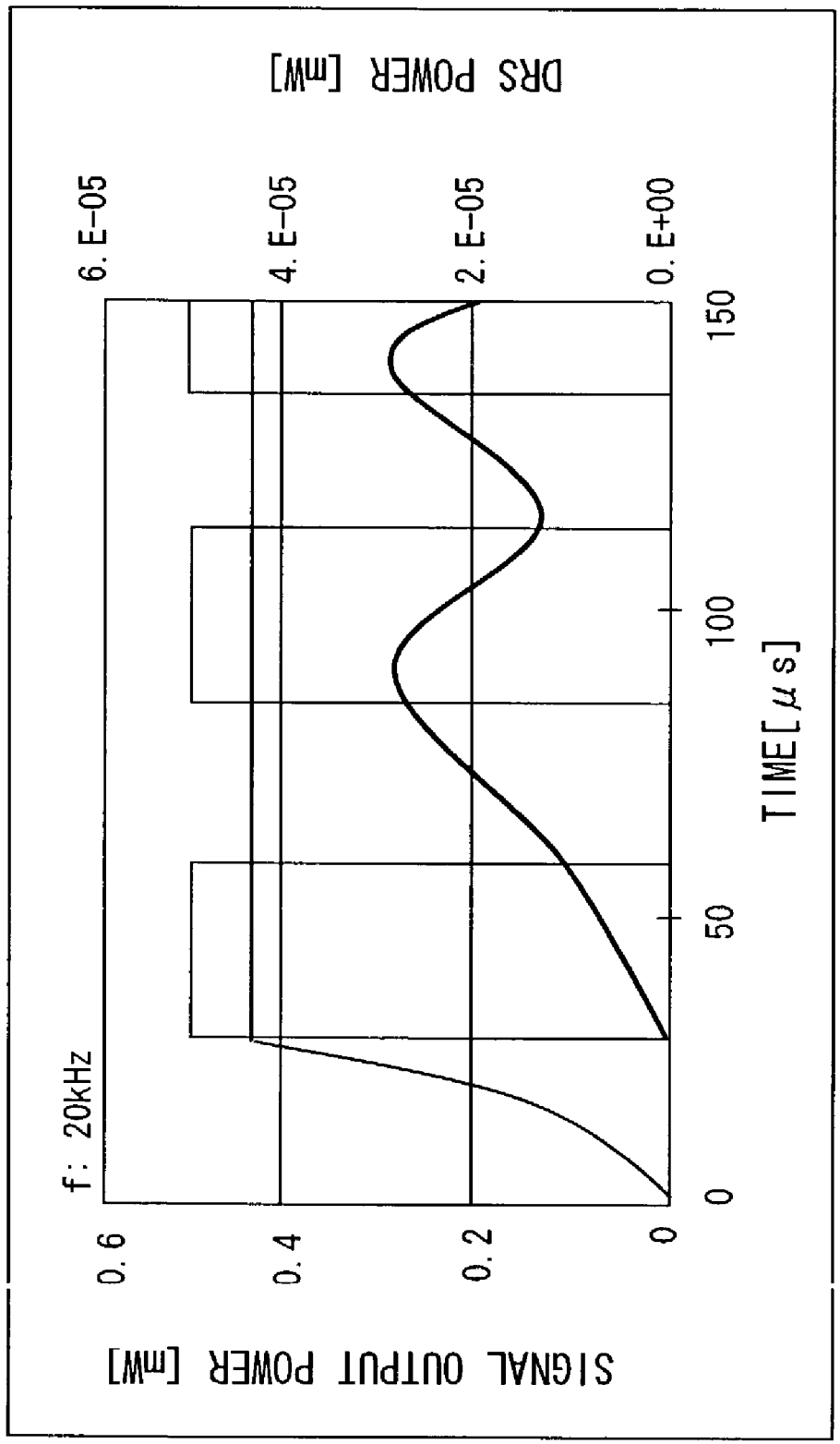
FIG. 10 shows an example (No. 1) of an output waveform of MPI light when an input pulse sequence is input.
Figure 11:
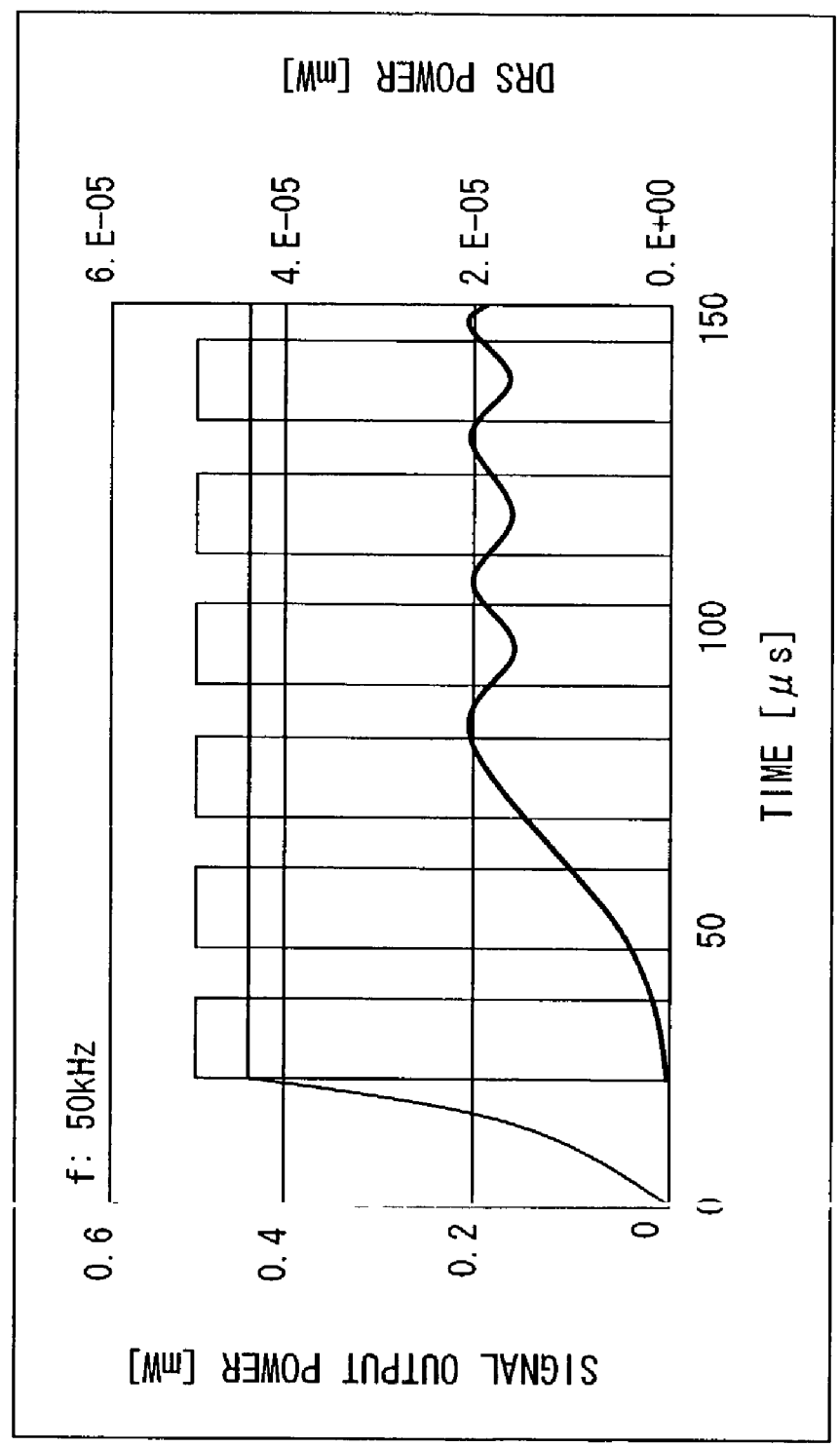
FIG. 11 shows an example (No. 2) of the output waveform of the MPI light when the input pulse sequence is input.

Generally, MPI light is measured if a pulse light signal having a predetermined cycle is input by several cycles or more to the target to be measured 13 shown in FIG. 2, and, for example, if a steady state is reached. FIGS. 10 and 11 exemplify the waveforms of an output rectangular pulse and MPI light (indicated by a thick line) in the case where such a pulse sequence is input to the target to be measured 13. In FIG. 10, the cycle of the input pulse signal is relatively long, and the power of MPI light significantly fluctuates even in a time period during which the output pulse is OFF. In the meantime, in FIG. 11, the cycle of the input pulse signal is short, and the power of MPI light is proved to fluctuate a little in the steady state. As described above, to improve the measurement accuracy of the power of MPI light, the cycle T must be made short so as to suppress fluctuations of the power of MPI light in addition to the shortening of the cycle of a pulse signal, as explained with reference to the expression (1).

FIG. 12 exemplifies fluctuations of a measurement value of the signal to MPI noise ratio when the operational waveform of the optical modulator 14, namely, the rising timing of the output switch is changed. In (c) of FIG. 3, this rising timing matches that of the input pulse signal. FIG. 12 shows how the maximum and the minimum values of a crosstalk value, which is measured when this timing is changed in a time period during which the output pulse signal is OFF, fluctuate with the modulation frequency. This crosstalk indicates the ratio of the intensity of output signal light to that of multi-path interference light. As this value becomes smaller, an error rate becomes higher, and communication quality gets worse.

Indicated here is a result obtained when the length of the target to be measured is 14.4 km, the duty ratio of the input light signal is 0.5, and an ON/OFF duty ratio of the output switch, namely, the operational pulse of the optical modulator is 0.25. This result indicates that the fluctuations of the measured value are small if the modulation frequency is 10 kHz or higher, even when the rising timing is changed.

Figure 13A:
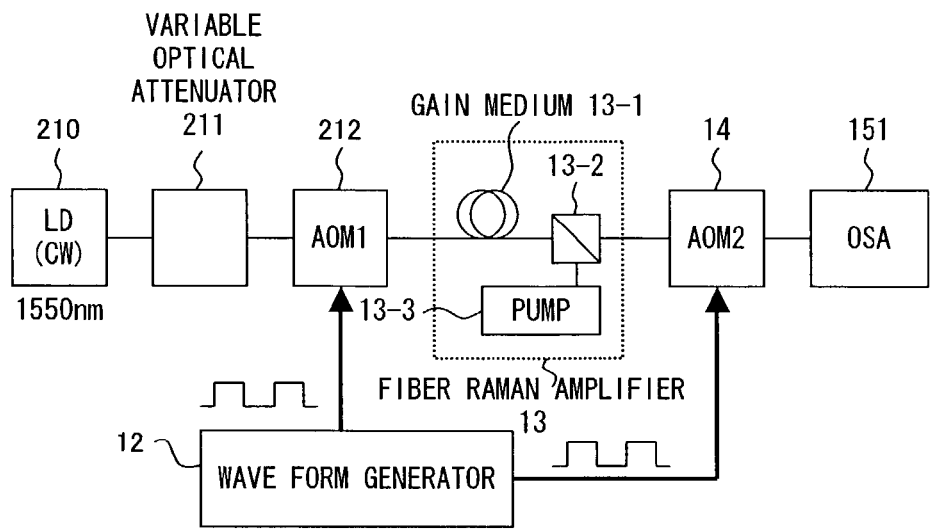
FIG. 13A shows a configuration implemented when multi-path interference light of a Raman amplifier is measured with a pulse-OSA method.

FIG. 13A shows a configuration implemented when multi-path interference light of a Raman amplifier is measured with a pulse-OSA method.

210 is a light source, which emits carrier light. 211 is a variable optical attenuator, which adjusts the light from the light source to arbitrary light power. 212 is an optical modulator, which modulates the carrier light to a rectangular pulse. 13 is a Raman amplifier, which is to be measured. 13-1 is a gain medium, which performs Raman amplification. 14 is an optical modulator, which generates measurement timing of MPI light. 151 is an optical spectrum analyzer.

Figure 13B:
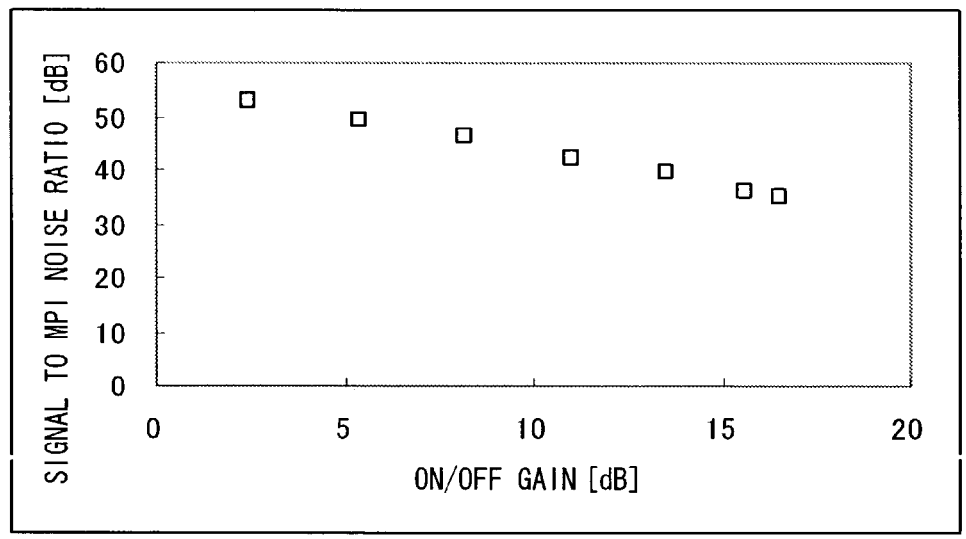
FIG. 13B shows a measurement result of the signal to MPI noise ratio when an ON/OFF gain of the Raman amplifier is changed in the configuration shown in FIG. 13A.

A graph represented by FIG. 13B shows a measurement result of the signal to MPI noise ratio when an ON/OFF gain of the Raman amplifier is changed in the configuration shown in FIG. 13A.

The above provided explanation refers to the measurements of the power of MPI light by using the single light source 11 as shown in FIG. 2. However, also the wavelength dependency of MPI light can be measured by using a plurality of light sources. FIG. 14 is a block diagram showing the configuration of a multi-path interference light measuring apparatus which measures the wavelength dependency of MPI light as described above. In this figure, a plurality of light sources 21 of different wavelengths are used as a replacement for the light source 11 shown in FIG. 2. After lights from the plurality of light sources are respectively rectangular-pulse-modulated, and multiplexed by an optical multiplexer 22, the multiplexed light is input to the target to be measured 13.

FIG. 15 is a block diagram exemplifying another configuration of the apparatus measuring the wavelength dependency of MPI light. Comparing with FIG. 14, there is a difference in a point that after lights from a plurality of light sources 21 are multiplexed by an optical multiplexer 22 before being pulse-modulated, and rectangular-pulse-modulated by an optical modulator 23, the modulated light is input to a target to be measured 13 in FIG. 15.

Figure 16:
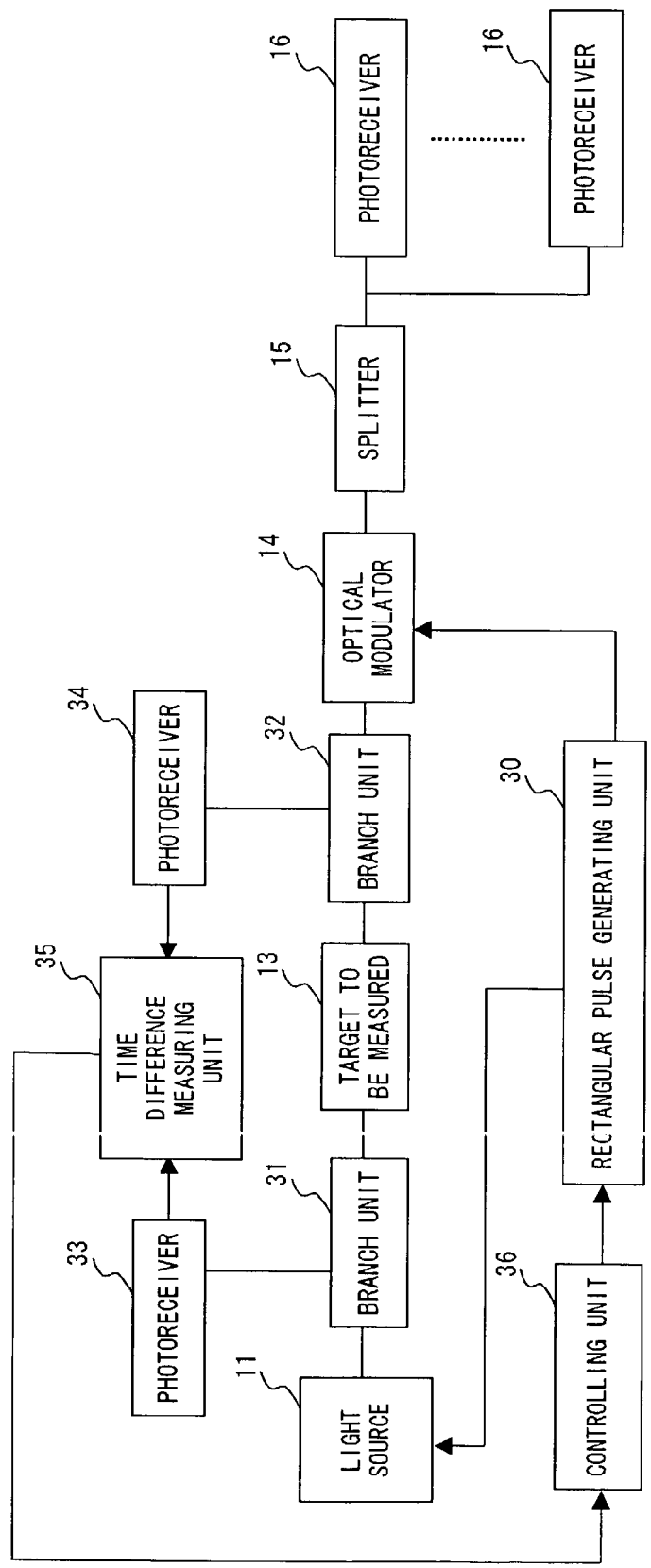
FIG. 16 is a block diagram exemplifying the configuration of a multi-path interference light measuring apparatus according to a second preferred embodiment.

FIG. 16 is a block diagram showing the configuration of a multi-path interference light measuring apparatus according to the second preferred embodiment of the present invention. In the first preferred embodiment, the cycle of a pulse waveform input to the target to be measured is set based on the assumption that the length L of the optical medium of the target to be measured 13, and its group refractive index N in FIG. 2 are learned as explained with reference to the expression (1). In the meantime, in the second preferred embodiment, the cycle is set by measuring the propagation time of light within a target to be measured 13, which corresponding to the right side of the expression (1), and by using the measured value, for example, if the length of an optical medium of the target to be measured 13 is not learned, and the cycle cannot be set with the expression (1).

In FIG. 16, in a similar manner as in FIG. 2, the output of a light source 11 is input to the target to be measured 13 via a branch unit 31 as a rectangular pulse modulated by a modulation pulse from a rectangular pulse generating unit 30, and also input to a photoreceiver 33, and the output from the target to be measured 13 is output to an optical modulator 14 via a branch unit 32, and also provided to a photoreceiver 34.

By using the outputs of the photoreceivers 33 and 34, the propagation time of the input optical pulse within the target to be measured 13 is measured by a time difference measuring unit 35. The rising timing and the duty ratio of the pulse as the modulation signal that the rectangular pulse generating unit 30 outputs to the light source 11 and the optical modulator 14 are controlled based on the measured value by a controlling unit 36 in a similar manner as in the first preferred embodiment. Additionally, also the wavelength dependency can be measured as described with reference to FIGS. 14 and 15.

In the second preferred embodiment shown in FIG. 16, the cycle of the pulse signal is set to a value such as 1/10, which is sufficiently smaller than a measured value resultant from the measurement made by the time difference measuring unit 35, and, for example, only one pulse is input to the target to be measured 13, whereby the power of MPI light is measured, and system settings using its result are made. The setting of the rising timing of the output switch, which is explained with reference to FIG. 5, the setting of the duty ratio of the output switch, which is explained with reference to FIG. 6, and the like can be made in a similar manner as in the first preferred embodiment.

Figure 17:
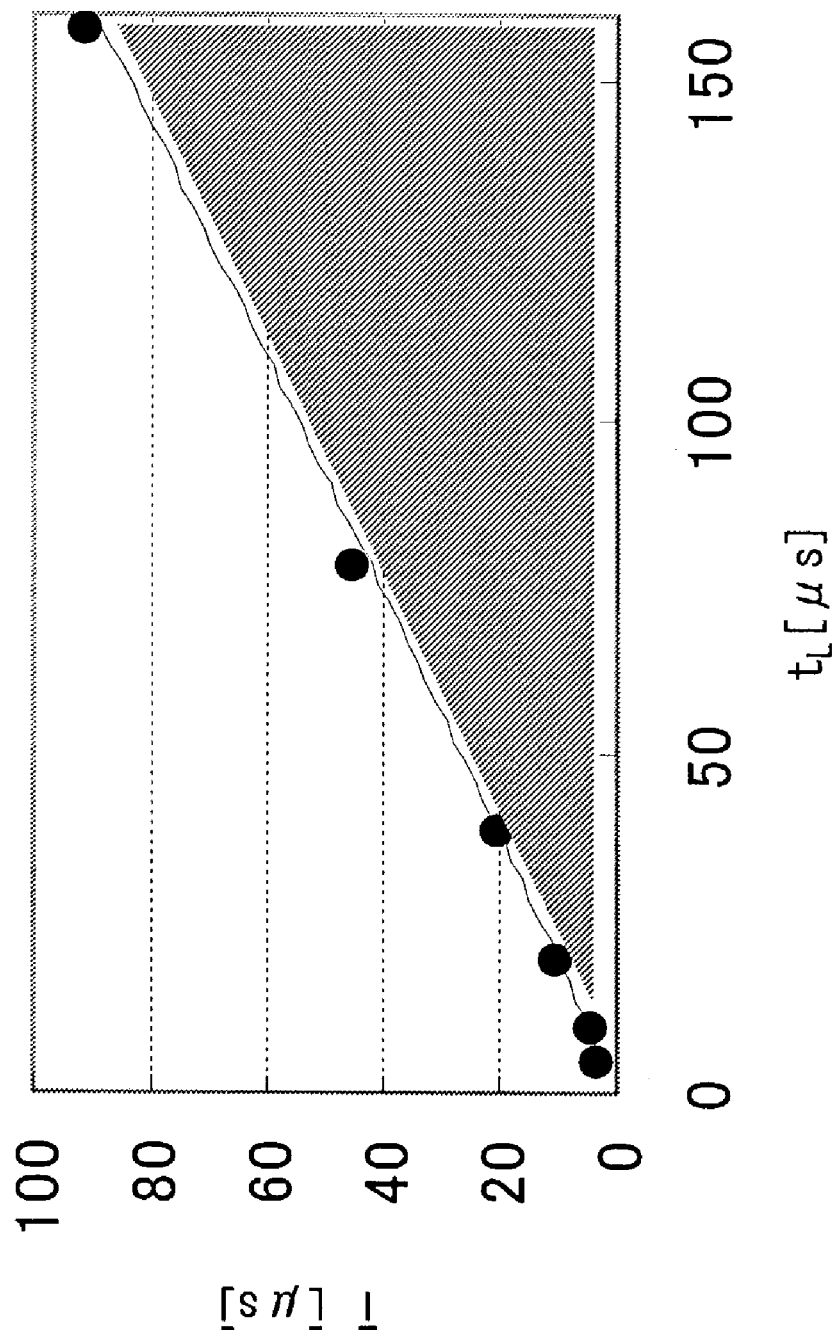
FIG. 17 exemplifying the setting of a cycle T of a rectangular pulse on an input side in the second preferred embodiment.

FIG. 17 exemplifies the setting of the cycle T of a rectangular pulse on an input side in the second preferred embodiment. This figure exemplifies the setting of the cycle T, which corresponds to the propagation time $t_L$ as a measurement result of the time difference measuring unit 35 shown in FIG. 16.

In FIG. 17, an area in and below a line which connects black circles indicates the setting range of the cycle T, which is required to measure multi-path interference noise light with accuracy of 0.2 dB or lower. To further improve the accuracy, the slope of this boundary line must be reduced. This figure indicates that multi-path interference light can be measured with the accuracy of 0.2 dB or lower by setting the cycle of the rectangular pulse to approximately 55 $\mu$s or smaller, by way of example, if $t_L$=100 $\mu$s, namely, if an optical fiber having a refractive index of 1.5 is used, and its length is approximately 20 km. The measurement itself can be made even if the cycle T of the rectangular pulse is in and above the boundary line. However, a measurement error becomes large depending on the value of the cycle T.

Up to this point, the preferred embodiments according to the present invention are described in detail. However, preferred embodiments of the present invention are not limited to the above described implementations. It goes without saying that a wider variety of preferred embodiments can be implemented in correspondence with the scope claimed by the present invention.

As described above in detail, according to the present invention, the cycle, the duty ratio, etc. of an optical signal can be set according to effective settings of measurement conditions, such as the length of an optical medium of a target to be measured, and the value of a group refractive index in multi-path interference light measurement using, for example, a pulse-OSA method.

Furthermore, effective measurement parameters can be set by using a measurement value of the propagation time of an optical pulse within a target to be measured, for example, if the length of an optical medium of the target to be measured is not learned. This greatly contributes to an improvement in the practicability of a pulse-OSA method.

What is claimed is:

1. A multi-path interference light measuring method inputting pulse-modulated signal light to a target to be measured, and measuring multi-path interference light included in light output from the target to be measured, comprising:

setting a cycle of pulse modulation on an input side in correspondence with a length of an optical medium of the target to be measured.

2. The multi-path interference light measuring method according to claim 1, wherein the cycle is set to L×N/c or smaller in correspondence with velocity c of light, a length L of the optical medium of the target to be measured, and a group refractive index N of the optical medium.

3. The multi-path interference light measuring method according to claim 1, further comprising modulating an output pulse signal by using a pulse signal for modulation, which has a same cycle as the set cycle, and whose delay time from a rising time of input pulse light is determined according to the cycle, a duty ratio of an input pulse signal, and a propagation time of an optical pulse within the optical medium.

4. The multi-path interference light measuring method according to claim 3, wherein a duty ratio of the pulse signal for modulation is set in correspondence with the duty ratio of the input pulse signal, and a rising time of the output pulse.

5. The multi-path interference light measuring method according to claim 1, further comprising splitting an output pulse signal after being modulated, and obtaining power of multi-path interference light by using power of a pulse input to the target to be measured, power of a spontaneous emission light component of an optical wavelength of the input pulse, power of a noise light component including multi-path interference light, a gain of the target to be measured, a duty ratio of the pulse signal for modulation, a ratio of extinguished light to an input optical pulse, and a ratio of light extinguished by the modulation.

6. The multi-path interference light measuring method according to claim 1, wherein light, which is obtained by wavelength-multiplexing lights output from a plurality of light sources of different wavelengths, and by pulse-modulating wavelength-multiplexed light, is input to the target to be measured.

7. A multi-path interference light measuring method inputting pulse-modulated signal light to a target to be measured, and measuring multi-path interference light from pulse signal light output from the target to be measured, comprising:

setting a cycle of pulse modulation on an input side in correspondence with a measurement result of time until an optical pulse input to the target to be measured is output from the target to be measured.

8. A multi-path interference light measuring apparatus inputting pulse-modulated signal light to a target to be measured, and measuring multi-path interference light from pulse signal light output from the target to be measured, comprising:

a cycle setting unit setting a cycle of pulse modulation on an input side in correspondence with a length of an optical medium of the target to be measured; and a modulating unit modulating the pulse signal light output from the target to be measured by using a modulation signal that has a same cycle as the set cycle, and can arbitrarily set a phase difference from the output pulse signal.

9. An optical signal inputting apparatus inputting pulse-modulated signal to a target to be measured in order to allow multi-path interference light to be measured from pulse signal light output from the target to be measured, comprising:

a cycle setting unit setting a cycle of pulse modulation on an input side in correspondence with a length of an optical medium of the target to be measured.

10. A multi-path interference light measuring apparatus measuring multi-path interference light from pulse signal light output from a target to be measured to which a pulse-modulated signal is input, comprising:

a modulating unit modulating an output pulse signal by using a pulse signal for modulation, which has a same cycle as an input pulse signal input to the target to be measured, and whose delay time from a rising time of the input pulse signal is determined according to the cycle, a duty ratio of the input pulse signal, and a delay time of an output pulse from the input pulse.

11. A multi-path interference light measuring apparatus inputting pulse-modulated signal light to a target to be measured, and measuring multi-path interference light from pulse signal light output from the target to be measured, comprising:

cycle setting means for setting a cycle of pulse modulation on an input side in correspondence with a length of an optical medium of the target to be measured; and modulating means for modulating the pulse signal light output from the target to be measured by using a modulation signal that has a same cycle as the set cycle, and can arbitrarily set a phase difference from the output pulse signal.

12. An optical signal inputting apparatus inputting pulse-modulated signal to a target to be measured in order to allow multi-path interference light to be measured from pulse signal light output from the target to be measured, comprising:

obtaining means for obtaining a length of an optical medium of the target to be measured; and cycle setting means for setting a cycle of pulse modulation on an input side in correspondence with the length obtained from said obtaining means for.

13. A multi-path interference light measuring apparatus measuring multi-path interference light from pulse signal light output from a target to be measured to which pulse-modulated signal is input, comprising:

signal generating means for generating a pulse signal for modulation, which has a same cycle as a pulse signal input to the target to be measured, and whose delay time from a rising time of input pulse light is determined according to the cycle, a duty ratio of the input pulse signal, and a delay time of an output pulse from the input pulse; and modulating means for modulating output pulse signal by using the pulse signal for modulation.

* * * * *